UNITED STATES PATENT OFFICE.

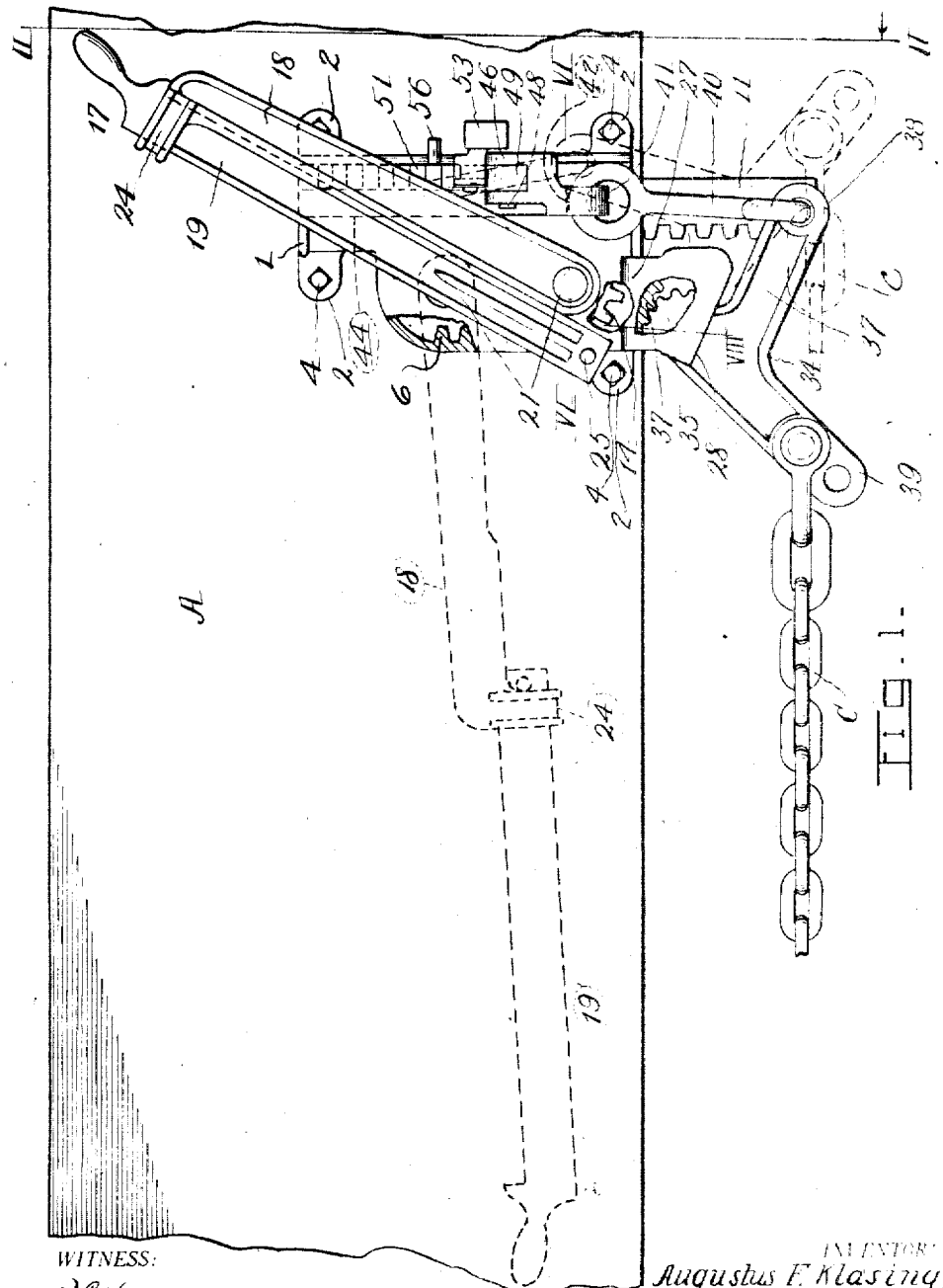

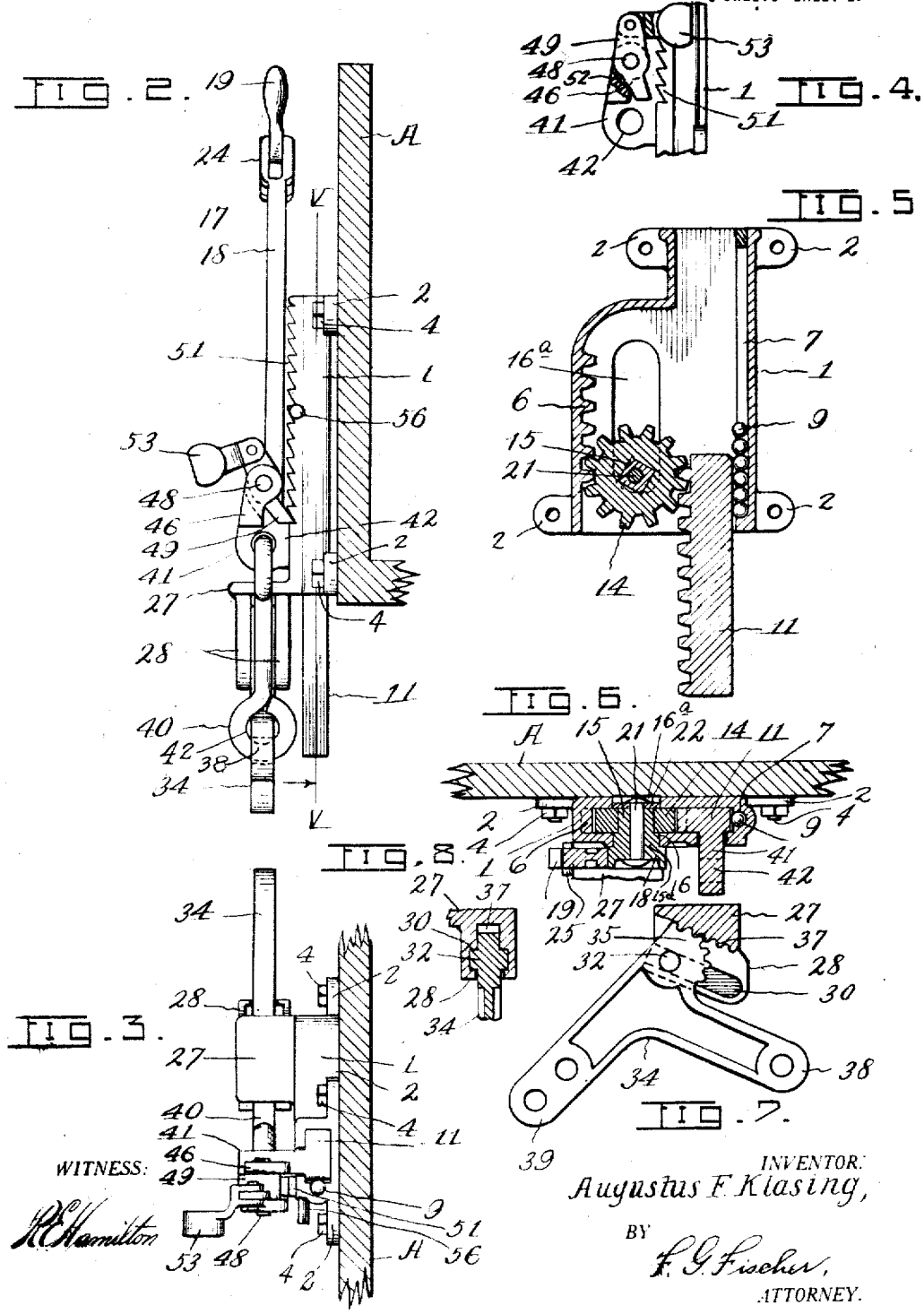

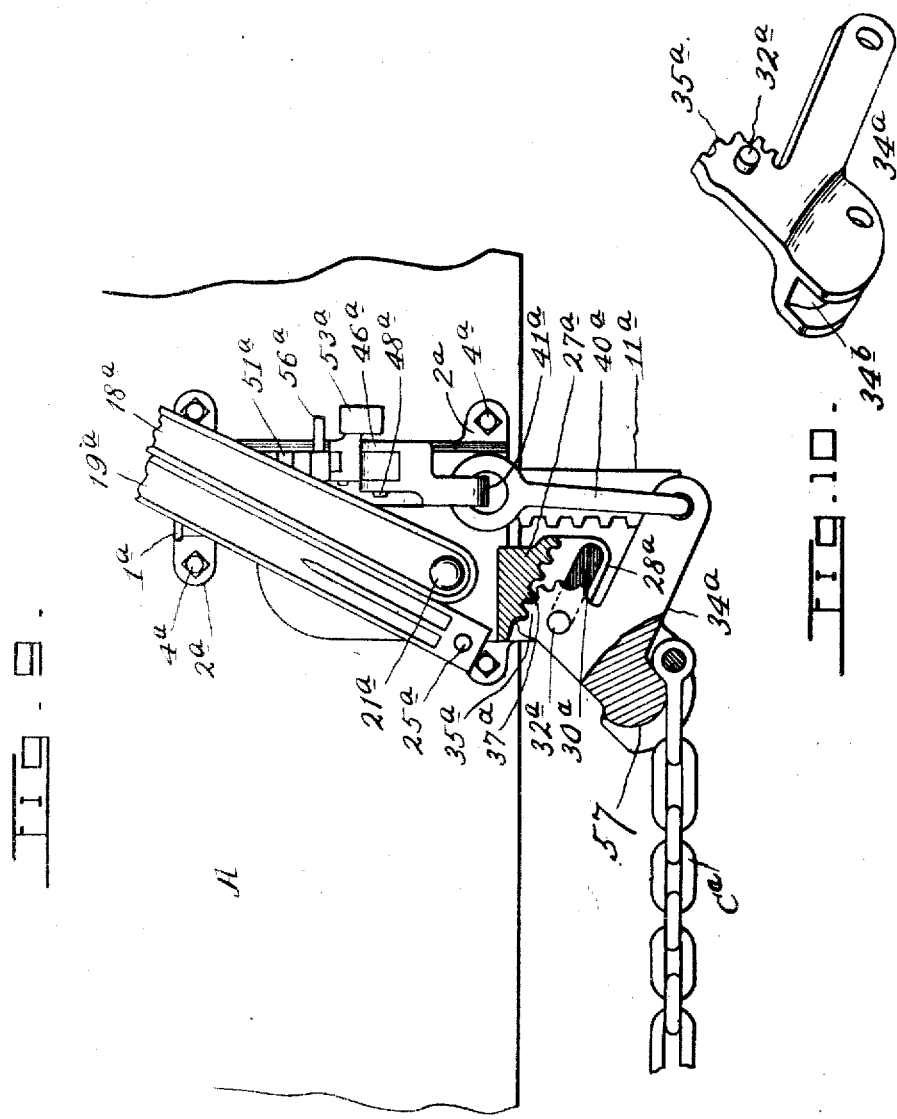

AUGUSTUS F. KLASING, OF DENVER, COLORADO, ASSIGNOR TO THE KLASING CAR BRAKE COMPANY, A CORPORATION OF COLORADO.

CAR BRAKE.

1,420,553.

Specification of Letters Patent. Patented June 20, 1922.

Application filed October 28, 1918. Serial No. 260,018.

*To all whom it may concern:*

Be it known, that I, AUGUSTUS F. KLASING, a citizen of the United States, residing at Denver, in the county of Denver and State of Colorado, have invented certain new and useful Improvements in Car Brakes, of which the following is a specification.

My invention relates to an apparatus for operating the brakes of a railway car, and pertains more particularly to a manually operated apparatus for setting and releasing railway car brakes, more especially the brakes of a freight car. The great increase in weight and capacity of modern freight cars makes it very difficult, with the old type of hand brake mechanism, to reliably control the car in switching, for example, by manual operation. Railway freight cars are ordinarily at the present time provided with a brake staff around which a chain is wound when the brakes are set, the staff being provided with a hand wheel and with a foot operated ratchet mechanism for holding the brakes in the set position. The operation of this mechanism is slow, requires very considerable exertion on the part of the brakeman, and is attended with great danger. The brakeman often uses a wooden pole or club which engages with the spokes of the hand wheel to augment the leverage. Even so, it frequently happens that the brakes cannot be set with sufficient power to prevent an impact likely to be dangerous to the brakeman and damaging to the car and its cargo. The chain does not always wind truly on the end of the staff and as a result the brakeman may believe the brakes are set when such is not the case. In releasing the brakes the holding dog is kicked out from the ratchet. The release produces a very quick and violent reaction likely to cause the brakeman to lose his balance if he has his hands on the wheel. These imperfections in the type of apparatus almost universally used at the present time in this country for the manual operation of freight car brakes have been the cause of considerable loss of life and injury to trainmen besides bringing about deterioration and damage to rolling stock and cargoes through collisions and impacts of one car with another.

The principal object of the present invention is to provide a manually operable brake mechanism which can be operated very quickly and certainly, which is capable of pressing the brake shoes against the wheels with very great force, and which can be operated with relatively small exertion on the part of the brakeman through movements of a lever operated by one hand, this latter feature enabling the brakeman to steady himself with the other hand by holding onto the car.

A further object of the invention is to provide a manually operated car braking apparatus which will be relatively simple in its construction, positive in its operation, strong, durable, and of such compactness of structure that it can be placed on the railway freight car without interference with other apparatuses usually associated with the car, and without undue protrusion of parts of the mechanism from the car body.

This application is for an improvement upon the brake operating apparatus disclosed in my prior application Serial No. 220,467, filed March 5, 1918. The invention consists in the new and improved arrangements, constructions and devices to be hereinafter described and claimed for carrying out the above stated objects and such other incidental objects as will be referred to in the following description of the preferred embodiment of the invention shown in the accompanying drawings. In the drawings—

Fig. 1 is a fragmentary side elevation of a railway car, of the gondola type, provided with a manually operated brake mechanism constructed in accordance with my invention; the full lines in this figure showing the positions of the parts when the brakes are released, and the dotted lines the positions of corresponding parts when the brakes are set.

Fig. 2 is a sectional elevation on line II—II of Fig. 1.

Fig. 3 is a sectional plan illustrating portions of the brake mechanism.

Fig. 4 is a detail sectional elevation illustrating the construction of the detent device for holding the brakes in set position.

Fig. 5 is a sectional view on line V—V of Fig. 2.

Fig. 6 is a sectional plan on line VI—VI of Fig. 1.

Fig. 7 is a vertical sectional view illustrating the construction of the device for transmitting power from the lifting or power applying portion of the mechanism to the brake rigging on the under side of the car.

Fig. 8 is a detail sectional view on line VIII—VIII of Fig. 1.

Fig. 9 is a side elevation, with parts in section, illustrating a modification, and Fig. 10 is a detail view, in perspective, of the improved form of transmission device employed in the modified construction.

Referring first to Figs. 1 to 8 inclusive, A designates one side of a railway car to which the brake mechanism of my invention is applied. It will be understood that the invention is not to be considered as limited to use on a gondola car or to the application of the working parts to the side of the car. With modifications which will be obvious to those skilled in this art, the mechanism can be readily adapted for installation upon either the ends or sides of box cars or upon other types of railway cars.

In the preferred embodiment of the invention disclosed in the drawings, 1 designates a housing provided with lugs 2 adapted to be secured to the body of the car by bolts 4. The housing is formed with an internal rack 6 on one side thereof, and in order to reduce friction it may be provided at its opposite side with a ball race 7 in which are arranged a series of antifriction balls 9 against which bears a movable rack bar 11. 14 designates a pinion adapted to mesh with the stationary rack 6 and the movable rack bar 11. The pinion is mounted on the square end 15 of a hub extension formed upon a hand lever 17, this lever being composed preferably of a lower member 18 and a handle member 19. The pinion is held upon the lever by a bolt 21 and washer 22. The hub on the lever is formed with a cylindrical portion 15$^a$ revolubly and slidably mounted in a slot 16 in one side of housing A, the washer being slidably mounted in a corresponding slot 16$^a$ in the corresponding side of the housing. The handle member 19 of the lever is slidably connected with the lower lever member 18 by a loop 24 formed on the latter. Studs 25 on the lower end of the handle member limit the outward movement of the latter.

C designates a chain or other tension member disposed under the car body and forming a part of the rigging employed for setting the brake shoes against the wheels of the car. Movement is transmitted to the tension member C from the movable element 11 of the power applying device just described by means of a rocking and rolling transmission element 34 which functions through its rocking movement to change the vertical pull on the member 11 to a horizontal pull on the member C, and by its movement translation, that is, the linear movement of its fulcrum, to increase the capacity of the apparatus for taking up slack in the brake connections over that which said apparatus would have if the transmission device rocked on a fixed pivot. The rocking transmission element 34 is associated with a supporting member 27 which, in the embodiment of the invention shown in the drawings, is formed integral with the housing 1. This supporting member is formed with a preferably inclined rack 37, the inclination of which is in the direction downwardly away from the brake chain C, with which engages a spur gear 35 formed at the junction of the two arms 38, 39 of the transmission device which is in the form of a bell crank. The supporting device 27 is provided with a pair of spaced, depending, guiding flanges 28 formed with internal channels 30, having the inclination of rack 37, into which project studs 32 formed on the bell crank 34. The brake operating chain, or other element employed in place thereof, is secured to the arm 39 of the bell crank. The other arm 38 of the bell crank is connected by link 40 with the rack bar 11, the latter being formed for this purpose with a lug 41 which is perforated as shown at 42.

The detent device is provided for holding the rack bar in the position to which it is moved to set the brakes. In the embodiment of the invention shown in the drawings, the upper end of the lug 41 on rack bar 11 is in the form of a clevis 46 to which is pivoted, by means of a pin 48, the detent or pawl 49 adapted to engage with the toothed holding or ratchet bar 51 within the housing 1. The lug 41 projects upwardly beyond the pivot 48 and has pivoted to its upper end a weighted tripping member 53 which normally serves to hold the pawl in engagement with ratchet bar 51. For release of the brakes the tripping device is turned from the position shown in Fig. 2 to that shown in Fig. 4. In the latter position it tends to throw and hold the pawl 49 out of engagement with the ratchet bar 51 and against a stop shoulder 52 formed on lug 41. 56 is a stud which projects from rack bar 51 into the path of the tripping device 53 when the latter is in the releasing position, shown in Fig. 4. The stud 56 is so placed as to throw the tripping device from the position shown in Fig. 4 to its original position (Fig. 2) when the rack bar on release of the brakes approaches the lower limit of its downward movement. This re-sets the pawl against the rack bar 51 so that it is in readiness to hold the same against downward movement at the next setting operation of the brakes.

In the modification shown in Figs. 9 and 10, the apparatus is constructed precisely as that just described, except for a change in the form of the transmission element. In these two figures the corresponding parts of the apparatus are given reference numerals corresponding to the reference numerals used in the first eight figures but with the distinguishing exponent "a." In the modified construction the arm of the transmission device or bell crank 34ª is formed with a rounded winding surface 57 and the brake operating chain Cª is attached to the bell crank so that when the latter is rocked the chain is brought to bear for a portion of its length against the surface 57. As a result there is no loss of take-up on the chain due to the angular movement of the bell crank but, on the contrary, by giving the surface 57 proper configuration the rocking of the bell crank may involve additional take-up on the chain.

*Summary of operation.*—To set the brakes the trainman, after extending the collapsible lever 17, pulls the lever to or toward the position shown in dotted lines in Fig. 1. It will be understood that the slack in the brake connections will differ for different cars, and for the same installation as the brake shoes and other parts of the brake mechanism wear, so that the extent to which the lever must be rocked will vary. The first movement of the lever takes up the slack of the brake connections. Its continued movement creates braking pressure between the brake shoes and wheels of the car. The apparatus may be operated with one hand. Due to the peculiar construction of the rocking and rolling transmission device, the take-up on the brake connections will be rapid and, when necessary, the amplitude of movement of the parts will be considerable without the necessity of making the transmission device of an inconvenient size. The brakes are held set by engagement of pawl 49 with the ratchet bar 51. To release the brakes the trainman moves the tripping device 53 from the position shown in Fig. 2 to that shown in Fig. 4. By pressing down on the operating lever 17 sufficiently to relieve the pressure between the pawl and the ratchet bar the pawl will be thrown out of engagement with the ratchet bar so that the operating lever and the other parts of the apparatus may be allowed to return to their normal positions of release. The downward movement of the rack bar 11 brings the tripping device 53 into contact with the stud 56. This reverses the position of the tripping device and throws the pawl 49 into contact with the ratchet bar in readiness to hold the brakes set on the next operation of the apparatus.

Having thus described my invention, what I claim and desire to secure by Letters Patent, is:

1. In a car brake, a member connected to the brake-shoe mechanism of a car, means for imparting a compound movement to said member, a manually-controlled member, means for imparting a compound movement to said manually-controlled member, and means operably-connecting said members so that the movements of said members are cumulative and act to set the brakes on a single pull of said manually-controlled member.

2. In a car brake, a movable member connected to the brake shoe mechanism, a movable rack operably-connected to said movable member to actuate the same, a housing in which said rack operates, a stationary rack within said housing, a pinion to traverse said stationary rack and actuate the movable rack, ratchet teeth on the housing, a pawl to engage said ratchet teeth and hold the movable rack at any point of its movement, and means for actuating said pinion.

3. In a car brake, a movable member connected to the brake shoe mechanism, a movable rack, a link connected to said movable rack and the movable member, a housing in which said rack operates, antifriction balls between the rack and an adjacent wall of the housing, a stationary rack within said housing a pinion to traverse said stationary rack and actuate the movable rack, and means for actuating said pinion.

4. In a car brake, a movable member connected to the brake shoe mechanism, a movable rack operably-connected to said movable member to actuate the same, a housing in which said rack operates, a stationary rack within said housing, a pinion to traverse said stationary rack and actuate the movable rack, ratchet teeth on the housing, a pawl to engage said ratchet teeth and hold the movable rack at any point of its movement, means for holding said pawl in engagement with the ratchet teeth, and means for actuating said pinion.

5. In a car brake, a movable member connected to the brake shoe mechanism, a movable rack operably-connected to said movable member to actuate the same, a housing in which said rack operates, a stationary rack within said housing, a pinion to traverse said stationary rack and actuate the movable rack, ratchet teeth on said housing, a pawl to engage said ratchet teeth and hold the movable rack at any point of its movement, a weighted member on said pawl for holding it out of engagement with the ratchet teeth when the brakes are to be released; a member on the housing for causing said weighted member to throw the pawl into engagement with the ratchet teeth after the brakes have been released, and means for actuating said pinion.

6. In a car brake, a bell-crank connected to the brake shoe mechanism, trunnions on said bell-crank, a supporting member having slotted guides in which said trunnions operate, cog teeth on said supporting member paralleling the slotted guides, a segmental gear on the bell-crank to traverse said cog teeth, a movable rack operably-connected to said bell-crank to actuate the same, a housing in which said rack operates, a stationary rack within said housing, a pinion to traverse said stationary rack and actuate the movable rack, and means for actuating said pinion.

7. In a car brake, a rockable member connected to the brake shoe mechanism of a car, means for imparting a rectilinear movement to said rockable member, a hand lever having an extensible handle, means for imparting a compound movement to said hand lever, and means operably-connecting the rockable member and the hand lever so that the movements of said member and hand lever are cumulative and act to set the brakes on a single pull of said hand lever.

8. In a car brake, a rockable member connected to the brake shoe mechanism of a car, a rockable member having a segmental portion connected to the brake shoe mechanism of a car to wind a part of the latter upon said segmental portion, means for imparting a rectilinear movement to said rockable member, a hand lever having an extensible handle, means for imparting a compound movement to said hand lever, and means operably-connecting the rockable member and the hand lever so that the movements of said member and hand lever are cumulative and act to set the brakes on a single pull of said hand lever.

9. In a car brake, a brake setting appliance comprising a rack operated by a pinion having both rotary and translatory motion, and means for connecting said rack to the brakes comprising a floating lever, one end of which is connected to the brakes and the other to said brake setting means, the fulcrum of which moves, when the brakes are being set, in a path away from the brakes and said brake setting means.

10. In a brake setting mechanism, the combination of a member operatively connected with the brakes, means for moving said member longitudinally to set the brakes, a device associated with said member for preventing reverse movement thereof, means for releasing said device to permit a reverse movement of said member, and means for automatically re-setting said device when said member has reached the limit of its reverse movement.

11. In a brake setting mechanism, the combination of a member operatively connected with the brakes, a housing for said member and means associated with said housing for moving said member to set the brakes, a pawl and ratchet, one carried by said member and the other by said housing for preventing the reverse movement of said member, means for releasing the engagement of said pawl with said ratchet to permit the reverse movement of said member, and means for automatically re-engaging said pawl with said ratchet when said member has reached the limit of its reverse movement.

12. In a brake setting mechanism, the combination of a member operatively connected with the brakes, a housing for said member and means associated with said housing for moving said member to set the brakes, a pawl carried by said member and ratchet teeth on said housing adapted to be engaged by said pawl to prevent reverse movement of said member, means for releasing the engagement of said pawl with said ratchet to permit the reverse movement of said member, and means for automatically re-engaging said pawl with said ratchet when said member has reached the limit of its reverse movement.

13. In a brake setting mechanism, the combination of a member operatively connected with the brakes, a housing for said member and means associated with said housing for moving said member to set the brakes, a pawl carried by said member and ratchet teeth on said housing adapted to be engaged by said pawl to prevent reverse movement of said member, means associated with said pawl adapted to hold the same either in or out of engagement with said ratchet teeth, and a projection on said housing adapted to engage said holding means after the release of the brakes to cause said means to hold said pawl in engagement with said ratchet teeth.

14. In a brake setting mechanism, the combination of a member operatively connected with the brakes, a housing for said member and means associated with said housing for moving said member to set the brakes, a pawl carried by said member and ratchet teeth on said housing adapted to be engaged by said pawl to prevent reverse movement of said member, a pivoted weight associated with said pawl and adapted to press the same either in or out of engagement with said ratchet teeth and a projection on said housing adapted to engage said weight after the release of said brakes to cause said weight to again press said pawl into engagement with said ratchet teeth.

15. In a brake mechanism, the combination of a movable rack operatively connected to the brakes, a housing for said rack, a pinion thereon meshing with said rack for moving the same, a pawl and ratchet, one carried by said housing and the other by said rack for preventing reverse movement of said rack, means for disengaging said pawl from said ratchet to permit the reverse movement of said rack, and means for automatically re-engaging said pawl with said ratchet when said rack reaches the limit of its reverse movement.

16. In a car brake, the combination of a member connected to the brakes, power applying mechanism for setting the brakes, means connecting said power applying mechanism and said member for multiplying the movement of said power applying mechanism, and means associated with said member for giving the same a compound movement.

17. In mechanism for manipulating the brakes of a railway car, the combination of a power applying device, a rocking transmission element, a tension member movable substantially in the direction of its length pivoted to the transmission element and the power applying device, and a connection between the brakes and the transmission element comprising a flexible member attached to the latter; said transmission element adapted to move bodily when rocked to increase the take-up of said connection and being formed with a surface against which the flexible member bears for a portion of its length, when said element is rocked, for the purpose described.

18. In mechanism for manipulating the brakes of a railway car, the combination of a rocking and rolling transmission element at the bottom of the car, a substantially horizontally disposed connection between the brakes and the transmission element comprising a flexible member attached to the transmission element, a power applying device arranged above said transmission element, a substantially vertically movable element connecting the transmission element to the power applying device, the transmission element being formed with a surface against which said flexible member bears for a portion of its length, when said transmission element is rocked, for the purpose described.

19. In apparatus for operating the brakes of a railway car, the combination of a member movable in the direction of its length, manually operated means for moving the same, means providing a connection between the movable member and the brakes, a detent device for holding said movable member in the position it occupies when the brakes are engaged with the wheels of the car, which device is adapted to be set to allow reverse movement of said member for release of the brakes, and means for automatically re-setting said device to its operative position at the end of said reverse movement of said member.

20. In apparatus for operating the brakes of a railway car, the combination of a member movable in the direction of its length, manually operated means for moving the same, means providing a connection between the movable member and the brakes, a detent device comprising a ratchet and pawl, one on the movable member and the other stationary on the car, a pivoted tripping device to hold the pawl in or out of engagement with the ratchet, and means whereby the pawl and tripping device are automatically set to engage the pawl with the ratchet by a movement of said movable member in the direction to release said brakes.

21. In apparatus for operating the brakes of a railway car, the combination of a member movable in the direction of its length, manually operated means for moving the same, means providing a connection between the movable member and the brakes, a detent device comprising a ratchet stationary on the car and a pawl on the movable member, a pivoted tripping device to hold the pawl in or out of engagement with the ratchet, and means whereby the pawl and tripping device are automatically set to engage the pawl with the ratchet by a movement of said movable member in the direction to release said brakes.

22. In apparatus for operating the brakes of a railway car, the combination of a movable rack bar, a rack stationary on the car, a floating pinion engaging said rack bar and rack, a lever for rotating and raising said pinion, means providing a connection between the rack bar and the brakes, a detent mechanism for holding said rack bar in the position it occupies when the brakes are in engagement with the wheels of the car, which mechanism is adapted to be set to allow reverse movement of said rack bar for release of the brakes, and means for automatically resetting said detent mechanism to its operative position at the end of said reverse movement of said rack bar.

23. In apparatus for operating the brakes of a railway car, the combination of a movable rack bar, a rack stationary on the car, a pinion interposed between said rack and rack bar and movable along the rack, means for rotating the pinion, a rocking transmission element, and connections between the transmission element and the rack bar and brakes respectively, said transmission element adapted to roll as it is rocked in a direction to increase the capacity of the apparatus for taking up the slack in the brake connections.

24. In apparatus for operating the brakes of a railway car, the combination of a movable rack bar, a rack stationary on the car, a pinion interposed between said rack and rack bar and movable along the rack, means for rotating the pinion, a rocking transmission element, connections between the transmission element and the rack and brakes respectively, said transmission element adapted to roll as it is rocked in a direction to increase the capacity of the apparatus for taking up the slack in the brake connections, a detent mechanism for holding said rack bar in the position it occupies when the brakes are in engagement with the wheels of the car, which mechanism is adapted to be set to allow reverse movement of said rack bar for release of the brakes, and means for automatically re-setting said detent mechanism to its operative position at the end of the reverse movement of said rack bar.

25. In apparatus for operating the brakes of a railway car, the combination of a movable rack bar, a rack stationary on the car, a pinion interposed between said rack and rack bar and movable along the rack, means for rotating the pinion, a rocking transmission element, connections between the transmission element and the rack bar and brakes respectively, said transmission element adapted to roll as it is rocked in a direction to increase the capacity of the apparatus for taking up the slack in the brake connections, the connection between the brakes and transmission element comprising a flexible member and the transmission element being formed with a surface against which said flexible element bears for a portion of its length when the transmission element is rocked.

26. In apparatus for operating the brakes of a railway car, the combination of a substantially vertically movable rack bar, a rack stationary on the car, a pinion interposed between said rack bar and rack and movable along the latter, means for rotating the pinion, a rocking transmission element arranged below the rack bar, a substantially horizontal connection between the transmission element and the brakes, and a connection between the transmission element and the rack bar, said transmission element being adapted to roll as it is rocked in the direction to increase the capacity of the apparatus to take up slack in the brake connections.

27. In apparatus for operating the brakes of a railway car, the combination of a substantially vertically movable rack bar, a rack stationary on the car, a pinion interposed between said rack bar and rack and movable along the latter, means for rotating the pinion, a rocking transmission element arranged below the rack bar, a substantially horizontal connection between the transmission element and the brakes, and a connection between the transmission element and the rack bar.

28. In apparatus for operating the brakes of a railway car, the combination of a substantially vertically movable rack bar, a rack stationary on the car, a pinion interposed between said rack bar and rack and movable along the latter, means for rotating the pinion, a rocking transmission element arranged below the rack bar, a substantially horizontal connection between the transmission element and the brakes, and a rigid link connecting the transmission element and rack bar, said transmission element being adapted to roll as it is rocked in a direction to increase the capacity of the apparatus for taking up slack in the brake connections.

29. In apparatus for operating the brakes of a railway car, the combination of a substantially vertically movable rack bar, a rack stationary on the car, a pinion engaging said rack bar and rack and movable along the latter, means for rotating said pinion, an angularly movable transmission element below the rack bar, a rigid link connecting the rack bar and transmission element, and a connection from the transmission element to the brakes.

30. In apparatus for operating the brakes of a railway car, the combination of a longitudinally movable member, a power applying element rotatable and removable lengthwise with respect to the longitudinally movable member, and engaged therewith to impart movement thereto, a rocking transmission element having connections with the longitudinally movable member and brakes respectively, said transmission device being movable bodily when rocked to increase the capacity of the apparatus to take up slack in the brake connections.

31. In apparatus for operating the brakes of a railway car, the combination of a longitudinally and vertically movable member, a power applying element rotatable and movable lengthwise with respect to the longitudinally movable member and engaged therewith to impart movement thereto, a rocking transmission element, a rigid link connecting said element with the longitudinally movable member, and a substantially horizontal connection between the transmission element and the brakes; said transmission element being movable bodily when rocked to increase the capacity of the apparatus to take-up slack in the brake connections.

32. In combination with the rigging on the under side of a railway car for setting and releasing the brake shoes, a substantially vertically movable rack bar on the body of the car, a stationary rack, a floating pinion engaging said rack bar and rack, a lever to rotate and raise said pinion, means for transmitting the vertical movement of said rack bar to a substantially horizontal pull on the aforesaid brake rigging, comprising a rocking and rolling member, and a rigid link connecting the same with said rack bar.

33. In combination with the brakes of a railway car: a power applying mechanism for setting said brakes comprising a substantially vertically movable rack bar, a stationary rack, a floating pinion engaging said rack bar and rack, means for rotating and raising said pinion: a transmission mechanism connecting the brakes with said rack bar; a detent device for holding said rack bar in the raised position which device is adapted to be set to disengage the rack bar for release of the brakes; and means operated by the downward movement of the rack bar for re-setting said detent mechanism to its operative position.

34. In combination with the brakes of a railway car, apparatus for manipulating the same comprising a power applying device, a rocking transmission element, a connecting rod between the power applying device and the transmission element, a connection between the transmission element and brakes comprising a chain, the latter attached to and adapted to wind upon said transmission element, the fulcrum of said transmission element adapted to travel, when the apparatus is manipulated, to increase the rapidity of take-up of the connections.

35. The combination with a railway car and its brakes, of apparatus for manipulating the brakes comprising a power applying device on the car, a member formed with a downwardly and outwardly extending rack fixed to the bottom of the car, a rocking and rolling transmission element having a toothed segmental fulcrum adapted to travel on said rack, a rod connecting said power applying device with said transmission element, and a connection between the transmission element and brakes comprising a chain which is adapted to be wound on the transmission element.

36. The combination with a railway car and its brakes, of apparatus for manipulating the brakes comprising a power applying device on the car, a member formed with a downwardly and outwardly extending rack fixed to the bottom of the car, a rocking and rolling transmission element having a toothed segmental fulcrum adapted to travel on said rack, a rod connecting said power applying device with said transmission element, said transmission element formed with a curved grooved edge, and a brake connection comprising a flexible member secured to said transmission element and adapted to be wound upon the grooved edge of the same.

37. The combination with a railway car and its brakes, of a brake operating connection under the car, a vertically movable member on the car, a rolling transmission element for transmitting movement from the vertically movable member to the brake operating connection, means for connecting said vertically movable member to said transmission element, and means for raising said vertically movable member.

38. The combination with a railway car and its brakes, of a brake operating connection under the car, a vertically movable member on the car, a rolling transmission element to which said brake operating connection is secured, a rod connecting said vertically movable member with the transmission element, and means for raising said vertically movable member.

39. The combination with a railway car and its brakes, of a brake operating connection under the car, a vertically movable member on the car, a transmission element mounted so that it is rocked and its fulcrum given translatory movement, means for connecting said vertically movable member to the transmission element, and means for raising said vertically movable member.

40. The combination with a railway car and its brakes, of a brake operating connection under the car, a vertically movable member on the car, a transmission element mounted so that it is rocked and its fulcrum given translatory movement, and means for raising said vertically movable member comprising a rolling member engaging the vertically movable member, and a lever for revolving and raising said rolling member.

41. The combination with a railway car and its brakes, of a brake operating connection under the car, a member on the car movable longitudinally, a transmission element operatively connected with the longitudinally movable member and with the brake connection which has angular motion and also translatory motion that increases the extent of movement of the brake operating connection with respect to that of the longitudinally movable member, and means for imparting movement to the longitudinally movable member having rotary and also translatory motion, and a lever to operate the same.

42. In combination with the brakes of a railway car, apparatus for manipulating the same comprising a power applying device having a member movable longitudinally and upwardly, a rocking transmission element having a segmental toothed fulcrum, a substantially vertical connection between the movable member of the power applying device and the transmission element, a substantially horizontal connection between the transmission element and the brakes, and a member fixed to the car having a rack upon which the fulcrum of the rocking element travels.

43. In combination with the brakes of a railway car, apparatus for manipulating the same comprising a power applying device having a member movable longitudinally and upwardly, a rocking transmission element having a segmental toothed fulcrum, a substantially vertical connection between the movable member of the power applying device and the transmission element, a substantially horizontal connection between the transmission element and the brakes, and a member fixed to the car having a diagonally downwardly extending rack upon which the fulcrum of the rocking element travels.

In testimony whereof I affix my signature, in the presence of two witnesses.

AUGUSTUS F. KLASING.

Witnesses:
F. G. FISCHER,
L. J. FISCHER.